(12) United States Patent
Long et al.

(10) Patent No.: US 7,177,350 B1
(45) Date of Patent: Feb. 13, 2007

(54) RECEIVER TRANSPARENT QUIESCENT MODE OPERATION IN A DSL TRANSMISSION SYSTEM

(75) Inventors: Guozhu Long, Newark, CA (US); Farrokh Rashid-Farrokhi, Pleasanton, CA (US); Syed Abbas, Fremont, CA (US)

(73) Assignee: Centillium Communications, Inc., Fremont, CA (US)

( * ) Notice: Subject to any disclaimer, the term of this patent is extended or adjusted under 35 U.S.C. 154(b) by 770 days.

(21) Appl. No.: 10/118,859

(22) Filed: Apr. 8, 2002

Related U.S. Application Data

(60) Provisional application No. 60/281,998, filed on Apr. 6, 2001.

(51) Int. Cl.
H04B 1/38 (2006.01)
H04L 5/16 (2006.01)

(52) U.S. Cl. .................................................. 375/222

(58) Field of Classification Search ............... 375/222, 375/298; 332/103; 370/206
See application file for complete search history.

(56) References Cited

U.S. PATENT DOCUMENTS

| | | | | |
|---|---|---|---|---|
| 5,515,398 | A * | 5/1996 | Walsh et al. ............... | 375/222 |
| 5,838,720 | A | 11/1998 | Morelli | |
| 6,064,193 | A * | 5/2000 | Hansen et al. ............. | 324/132 |
| 6,075,814 | A | 6/2000 | Yamano et al. | |
| 6,104,707 | A | 8/2000 | Abraham | |
| 6,236,674 | B1 | 5/2001 | Morelli et al. | |
| 6,240,141 | B1 | 5/2001 | Long | |
| 6,414,989 | B1 * | 7/2002 | Olafsson et al. ........... | 375/229 |
| 6,445,730 | B1 * | 9/2002 | Greszczuk et al. ......... | 375/219 |
| 6,445,731 | B1 * | 9/2002 | Yamano et al. ............. | 375/222 |
| 6,463,094 | B2 | 10/2002 | Koifman et al. | |
| 6,490,269 | B1 * | 12/2002 | Yamaura ................... | 370/343 |
| 6,584,160 | B1 * | 6/2003 | Amrany et al. ............. | 375/296 |
| 6,665,308 | B1 | 12/2003 | Rakib et al. | |
| 6,693,972 | B1 | 2/2004 | Flanagan | |
| 6,711,207 | B1 * | 3/2004 | Amrany et al. ............. | 375/222 |
| 6,721,355 | B1 * | 4/2004 | McClennon et al. ........ | 375/222 |
| 6,819,719 | B2 * | 11/2004 | Schelstraete ............... | 375/262 |
| 6,862,321 | B2 * | 3/2005 | Kaneko et al. ............. | 375/296 |
| 6,898,235 | B1 * | 5/2005 | Carlin et al. ............... | 375/219 |

OTHER PUBLICATIONS

Dagdeviren, "Proposed Peak To Average Ratio Reduction Technique For G.Lite and G.dmt", ITU Study Group 15, NF-074, May 11, 1998, 2 pages.
ITU—Telecommunication Standardization Sector Temporary Document IC-036, "G.gen: G.dmt.bis; G.lite.bis: : Receiver Transparent Q-mode," 8 pages, Irvine, CA, Apr. 9-13, 2001.
ITU—Telecommunication Standardization Sector Temporary Document MA-043, "G.gen.bis—Improved Suspend Type Quiescent Mode," pp. 1-13, Melbourne, Australia, Mar. 29-Apr. 1999.

* cited by examiner

*Primary Examiner*—Khai Tran
*Assistant Examiner*—Aslan Ettehadieh
(74) *Attorney, Agent, or Firm*—Fenwick & West LLP

(57) ABSTRACT

Operation of a digital subscriber line system in a power saving quiescent mode is described. A quiescent mode (Q-mode) is entered into from a steady-state or normal operation mode in which payload data is transmitted when criteria indicates that the transmitter has stopped transmitting payload data for a certain time period but that the current transmission session has not ended. A Q-mode signal is generated that uses constellation points that are used in the payload carrying state. The peak-to-average ratio (PAR) of the signal is also minimized by a PAR minimization method to find a combination of these constellation points satisfying a PAR threshold.

8 Claims, 11 Drawing Sheets

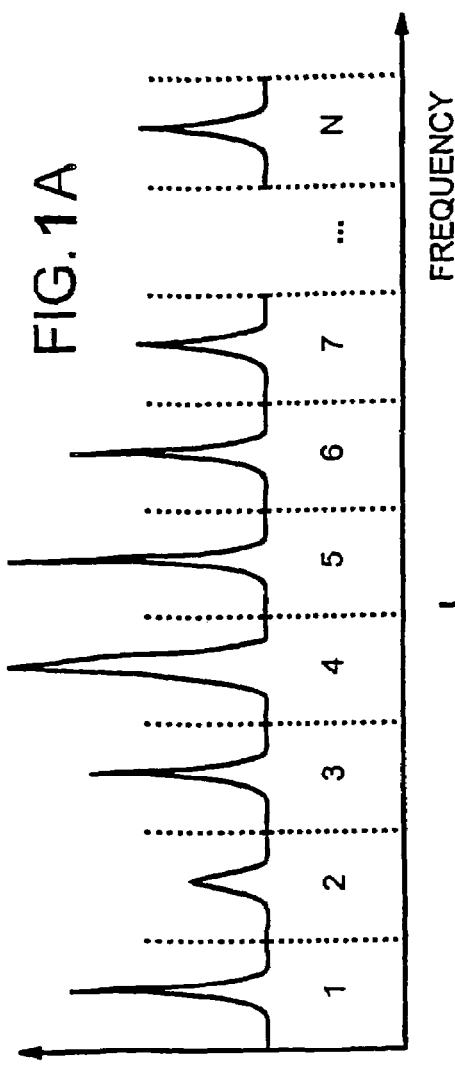
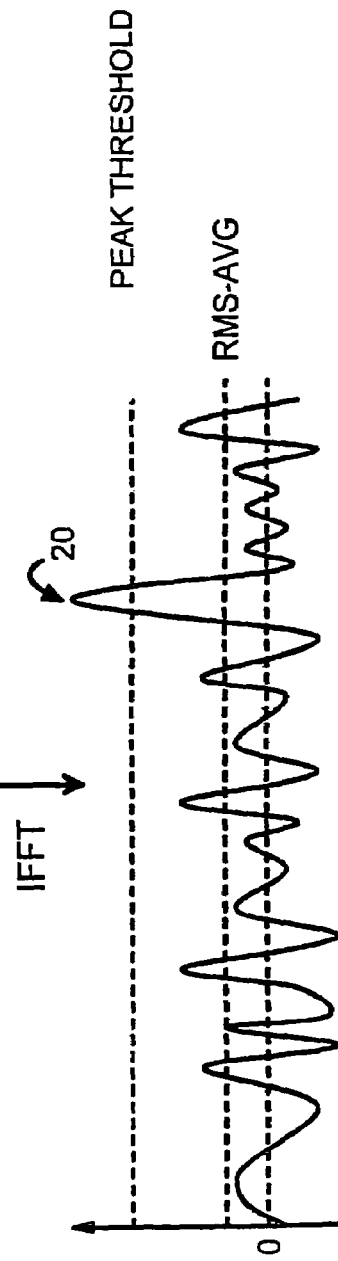
FIG.1A
FIG.1B
Prior Art

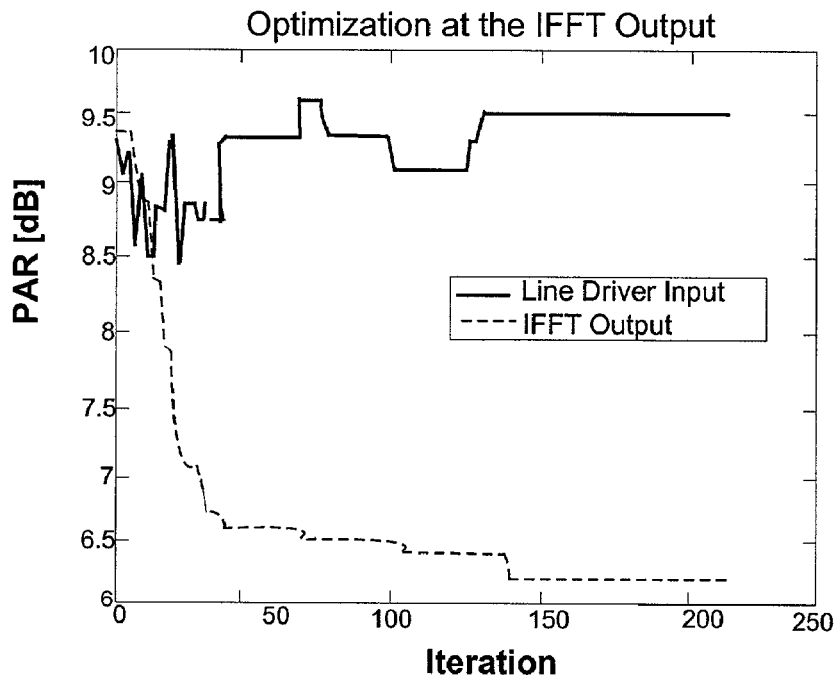
Figure 11: Optimal Quadrant Selection PAR reduction at IFFT Output
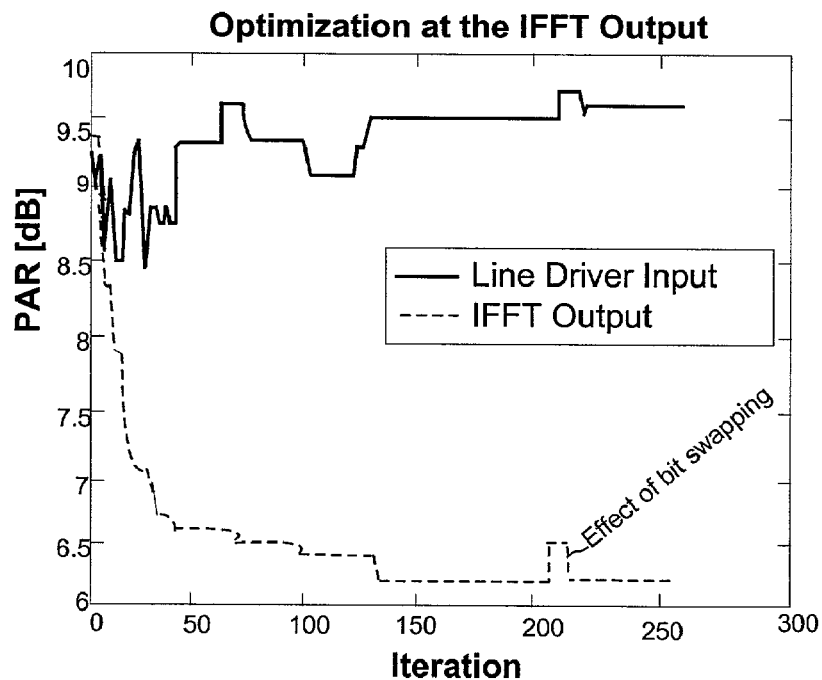
Figure 12: Optimal Quadrant Selection PAR reduction at IFFT Output

RECEIVER TRANSPARENT QUIESCENT MODE OPERATION IN A DSL TRANSMISSION SYSTEM

CROSS-REFERENCE TO RELATED APPLICATIONS

This application claims priority under 35 U.S.C. § 119(e) from U.S. provisional patent application 60/281,998, having a filing date of Apr. 6, 2001, entitled "G.gen, G.dmt.bis, G.lite.bis: Receiver Transparent Q-mode with Low Complexity and Low PAR," Inventors Guozhu Long, Farrokh Rashid-Farrokhi and Syed Abbas, which is hereby incorporated by reference.

BACKGROUND OF THE INVENTION

Field of the Invention

The present invention relates to a power saving mode such as a quiescent mode (Q-mode) in Digital Subscriber Line (DSL) modems.

Digital Subscriber Line (DSL) systems are high-bandwidth technologies that use the existing copper-cable telephone lines. One type of DSL can provide bandwidth up to 8 Mbps downstream, or up to 2 Mbps for symmetric transmission. Several variations of DSL technology include High bit-rate Digital Subscriber Line (HDSL), Asymmetric Digital Subscriber Line (ADSL) and Very high speed Digital Subscriber Line (VDSL). ADSL is particularly attractive for consumer Internet applications where most of the data traffic is downloaded to the customer. Upstream bandwidth for uploading data can be reduced to increase downstream bandwidth since most Internet traffic is downstream traffic.

Examples of multicarrier transmission techniques used in DSL systems include Quadrature Amplitude Modulation (QAM) and a version of QAM known as Discrete Multitone (DMT). Versions of digital subscriber line (DSL) systems that use DMT for multicarrier communication include asymmetric digital subscriber line (ADSL) and very high speed digital subscriber line (VDSL) systems.

In DMT, a channel comprises sub-channels, also referred to as frequency bins, bins, or carriers. Each sub-channel has sine and cosine frequencies that are integer multiples of a common frequency, the inverse of this common frequency being the symbol period. In some applications of DMT, the sub-channels use integer multiples of the reciprocal of the common frequency. The waves are sent over the sub-channel simultaneously, and the amplitude and phase of each wave represents a group of information bits. The sine and cosine frequencies in any sub-channel are orthogonal to those in any other sub-channel to ensure that interference does not exist between the sub-channels.

Each sub-channel is encoded to a constellation having points wherein each point is unique for each combination of bits. For example, a sub-channel carrying a 2-bit symbol would be encoded using a 4-point constellation, and a 3 bit symbol in another sub-channel would be encoded for an 8-point constellation.

In a DSL system using DMT, each receiver is tuned to all the sub-channels at once. Throughout transmission, a modem's receiver will be decoding the sub-channels.

The DSL modems have several stages of initialization and training in which the transmitter and receiver decide on operating parameters, for example options, filter values, the distribution of bits among the bins and fine gain adjustments of the bins, that will be in effect for a steady-state operation mode in which payload data is transmitted. An embodiment of this payload carrying state is SHOWTIME in the ADSL context.

There are times during SHOWTIME when the transmitter modem (such as may be located at a Central Office) is not sending any payload data. Payload data comprises user data such as a requested web page as opposed to filler or idle signals that are used to keep the transmitter and receiver synchronized. Such a state of no communication of payload data extending for a period of time provides an opportunity to be able to save power during this period of time. A state or mode of power saving triggered by no transmission of payload data for a defined time period is referred to hereafter as a quiescent mode or Q-mode.

At the transmitter side such as at a central office (CO), the benefits of a power saving quiescent mode are increased density, reduced cooling, reduced battery backup capacity and therefore reduced cost that are obtained by reducing the busy hour power consumption. At the receiver side such as may be located at a customer's premises equipment (CPE) substantial savings in idle power avoids the need to power the modem down when the remote is not in use, due to industry idle power requirements.

There are several approaches that may be tried to achieve the basic goal of Q-mode operation, that is, to be able to save power while payload data is not being transmitted. One simple way to achieve this objective is to shut off the transmitter when there is no data to send. This approach, however, is associated with a number of issues. For example, shutting off the transmitter causes non-stationary crosstalk in the associated loop binder. In addition, the upper layers of the communication system (e.g., backbone of the communication network such as Asynchronous Transfer Mode (ATM)) are required to interpret and respond to the powering down of the transmitter. Furthermore, the receiver will lose synchronization and therefore need to train up when the idle period ends (e.g., user data resumes).

Another technique to conserve power while a modem is idling is to send a special Q-mode signal which has a low peak-to-average ratio (PAR) when compared to the SHOWTIME signal. The peak-to-average ratio (PAR) is the ratio of the peak voltage to the root-mean-square RMS voltage of the transmitted time-domain signal. The average power of the transmitted signal is related to the root-mean-square (RMS) average of the signal.

FIG. 1A shows a frequency spectrum of a discrete-multitone DSL signal. The transmitted signal is composed of several separate carriers that are sufficiently separated in frequency so that the data from separate carriers can be extracted. The carriers are separated into frequency bins 0, 1, 2, 3, . . . N–1. The N carriers in N frequency bins are combined by the transmitter into a single output signal that contains information from all N carrier waves.

FIG. 1B shows a multi-carrier time-domain signal converted from the frequency-domain representation of FIG. 1A by an inverse fast-Fourier transform of the N carrier bins. Some of the samples of the time-domain signal are below the RMS voltage while other samples are above the RMS voltage. Peak voltages (e.g. peak voltage 20) cause problems when they exceed a peak threshold such as may be associated with the dynamic range of a digital-to-analog converter or an amplifier such as a line driver. More expensive and power-consuming DACs and line drivers with a wider dynamic range may be needed. The PAR depends on several factors, such as the line code used for symbol encoding, the number of carriers, and the number of signal levels used to encode the symbols. Filtering also affects the PAR, as does the channel (e.g. telephone line) and echo path for the received signal. Reducing the peak of the Q-mode signal while keeping the average power the same helps reduce the power consumption in the modem line driver. The modem line driver typically consumes a significant portion of the total power consumed in normal operation of the ADSL modem.

Known Q-mode techniques utilize a Q-mode "filler" symbol with low PAR properties in order to save power at the transmitter. Such a filler symbol may be defined in the transmitter and communicated to the receiver during initialization. Such proposals use REVERB or a similar 4-QAM signal as the filler, due to such signals having small PAR. However, the REVERB power spectral density (PSD) may not be similar to SHOWTIME PSD. In REVERB, all the bins are transmitted, while in SHOWTIME, some bins may not be transmitted. For example, on long loops, many high bins are not used. Also, the PSD in SHOWTIME is gain ($g_i$) scaled, while in REVERB, the gain is flat. Hence, if REVERB is used in Q-mode, it would still cause non-stationary crosstalk. To keep the crosstalk stationary, it is required that the average power of the Q-mode signal is about the same as the SHOWTIME signal. To deal with this issue, one could use a partial or $g_i$-scaled REVERB Q-mode signal, however, the PAR characteristics of such a signal is not necessarily the same as a pure REVERB signal anymore. Furthermore, REVERB does not necessarily have the lowest PAR. Other available signals may have lower PAR than REVERB. Thus, the definition of Q-mode filler symbols based on REVERB or 4-QAM signals would still generate non-stationary crosstalk during Q-mode.

In general, the most desirable features for Q-mode operation are the stationary aspect of the crosstalk, transparency to the receiver during SHOWTIME, and the ability to optimize the PAR characteristic of the Q-mode signal. None of the known techniques provide all these features. For example, while one technique may be transparent to the receiver during SHOWTIME, it fails to provide flexibility to improve the PAR characteristics of the Q-mode signal. Similarly, while another technique provides flexibility to improve the PAR characteristics of the Q-mode signal, it is not transparent to the receiver during SHOWTIME.

What is needed, therefore, is a Q-mode signal having an optimized PAR characteristic while also providing transparency to the receiver for transmission during Q-mode.

SUMMARY

The present invention overcomes or alleviates the disadvantages of the prior art by providing a system and method for generating a Q-mode signal having an optimized PAR characteristic and one of the QAM points $Q_i$ from a QAM constellation at each bin used during a payload carrying state of a DSL system. An example of such a state is SHOWTIME in ADSL transmission systems. A Q-mode signal is used for transmission between a transmitter and a receiver during a power saving or quiescent mode which is entered into from the steady-state or normal operation mode when criteria indicates that the transmitter has stopped transmitting payload data for a certain time period but that the current transmission session has not ended. In one aspect, the present invention provides for the selection of at least one of the QAM points, $Q_i$ from the SHOWTIME constellation at each bin used. Additionally, the gain ($g_i$) scale at each bin used during SHOWTIME is maintained during Q-mode, so that the Q-mode power spectral density (PSD) is very close to the SHOWTIME PSD. By keeping the same $g_i$ ripple, the stationary aspect of the crosstalk is maintained. Because the signal used in Q-mode is one of the SHOWTIME signal points, the receiver operates transparently. In other words, the receiver will continue to operate the same whether in SHOWTIME or Q-mode.

Another aspect of the invention provides for the optimization of the Q-mode signal to minimize PAR. In one embodiment, a system for minimizing the PAR of the Q-mode signal comprises a processing unit for performing a PAR minimization method, a bit-to-symbol encoder, an inverse fast-Fourier transformer for transforming symbols, $Q_i$'s, into a time-domain signal, and a power detector for detecting the average power and peaks outside the peak threshold. One or more of the elements of the system may be embodied in hardware, firmware, software or any combination of these. An example of one embodiment is a digital signal processor.

In one example, this system may be used to implement an embodiment of a method for minimizing the PAR of the Q-mode signal. The method comprises selecting a candidate set of constellation points used during the payload data carrying mode, {$Q_i$}, for each bin used during the payload data carrying mode, storing the candidate sets, and determining the optimum combination of points from all the candidate sets for a minimum PAR of the Q-mode signal to be transmitted. The set of binary input bits {$X_i$} corresponding to the optimum combination of $Q_i$ candidates is determined, stored in memory for use by the transmitter, and communicated to the receiver for storage in its memory. A computer usable medium may also comprise instructions which when executed cause a processor to perform the method.

In another aspect of the invention, the present invention provides a transmitter for use in a DSL system, the transmitter comprising a memory having a table for storing the set of binary input bits {$X_i$} corresponding to the optimum combination for minimizing PAR of $Q_i$ candidates, a mapping module for mapping the set of bits {$X_i$} to an input data stream to be transmitted during Q-mode, a QAM encoder for encoding an $X_i$ to its corresponding constellation point $Q_i$ in the combination, and an inverse Fast Fourier Transformer for generating a time domain signal representing the combination of $Q_i$ points.

In another aspect, the present invention provides an embodiment of a Q-mode signal comprising a combination of $Q_i$ points representing a time domain signal having a PAR within a threshold, each $Q_i$ point having an average power within a threshold of an average power of a point for the same bin of a low PAR signal that has a highly stationary crosstalk characteristic.

BRIEF DESCRIPTION OF THE DRAWINGS

FIG. 1A shows a frequency spectrum of a discrete-multi-tone DSL signal.

FIG. 1B shows a multi-carrier time-domain signal converted from the frequency-domain representation of FIG. 1A by an inverse fast-Fourier transform of the N carrier bins.

FIG. 11 illustrates results of a sequential quadrant optimization PAR minimization algorithm using a bin-by-bin approach where the PAR minimization is measured at the IFFT output.

FIG. 12 illustrates the effects of online reconfiguration due to bit swapping of a few bins on the PAR results from the sequential quadrant optimization PAR minimization algorithm that used the bin-by-bin approach.

DETAILED DESCRIPTION OF THE DRAWINGS

In one embodiment of the present invention, the set of input bits $\{X_i\}$ corresponding to a combination of $Q_i$ points used during the payload data carrying mode, that result in a time domain signal satisfying a PAR minimization threshold, are determined before entry into the payload data carrying stage. In an ADSL system embodiment, the determination of this set of input bits is performed in training after the transmitter has received a message from the receiver including one or more tables indicating the $b_i g_i$ for each bin to be used during SHOWTIME, e.g., $b_i g_i$ table 493. The $b_i$ specifies the number of bits to be used on the ith sub-carrier, sub-channel or bin, and the $g_i$ indicates the fine gain adjustment or transmit gain factor for the ith bin.

Figure 2:
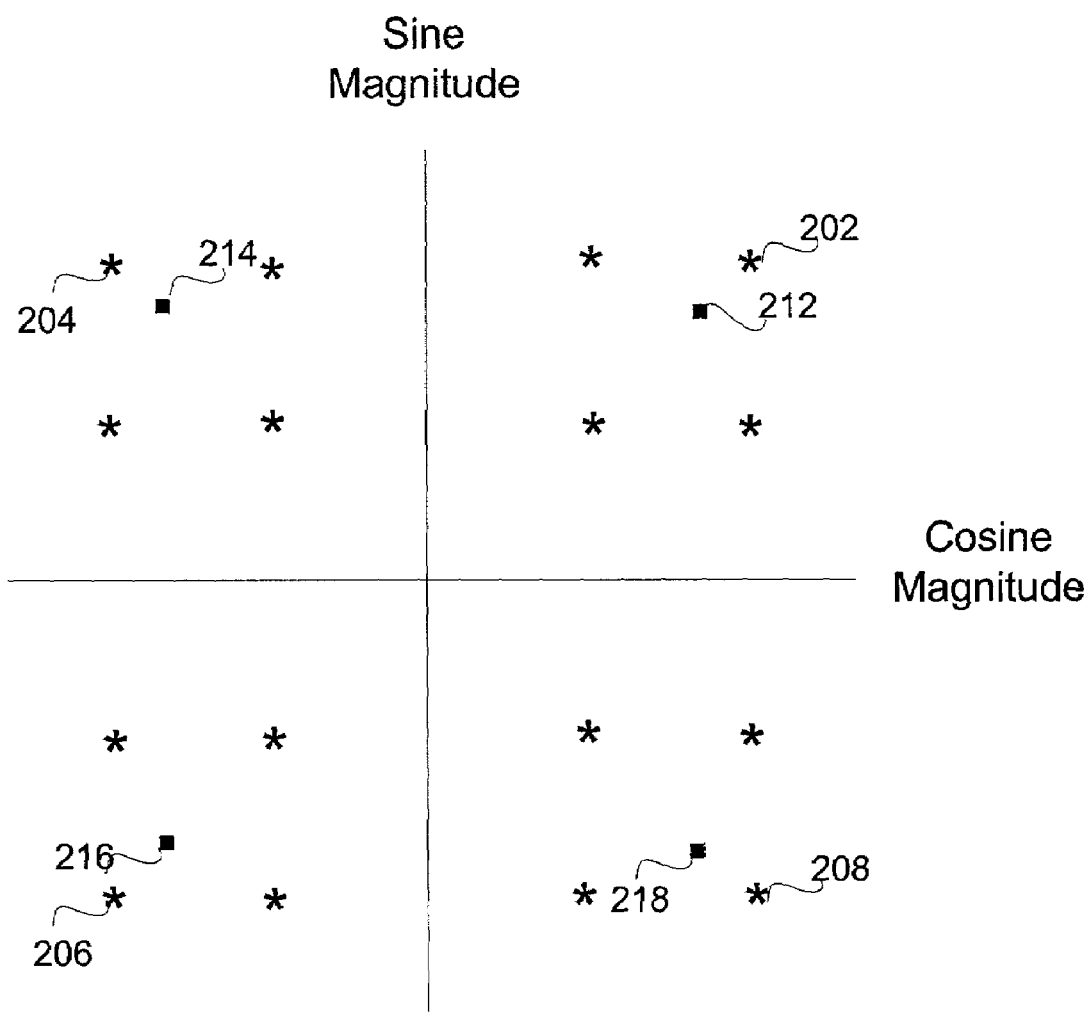
FIG. 2 illustrates an example of a constellation map of a 4-QAM low PAR signal having a stationary crosstalk characteristic for a bin, and an example a 16-QAM SHOWTIME constellation for the same bin in accordance with an embodiment of the present invention.

FIG. 2 illustrates an example of a constellation map including a 4-QAM constellation of points 212, 214, 216, 218 for a low PAR signal having a stationary crosstalk characteristic for a bin, and an example 16-QAM SHOWTIME constellation of points for the bin as represented by asterisks. Each point represents the power of the signal for that point. An example of a 4-QAM signal that may be used is REVERB. In each quadrant, there is a point 202, 204, 226, 208, each with the same power, that is closest to the power of the point 212, 214, 216, 218 of the REVERB signal. As long as this power difference or power deviation is within a threshold, each of these points 202, 204, 206, 208 is a candidate $Q_i$ point for this ith bin and together they form an example of a candidate set for this ith bin.

A table for candidate $Q_i$ based on $b_i$ can be pre-calculated and stored locally in a memory. For example, the values in Table 1 are calculated by minimizing the difference between the SHOWTIME constellation points and the REVERB 4QAM (bi=2). The SHOWTIME constellation points for $g_i = 1$ are known, and the comparison is done when $g_i = 1$. Since multiple (e.g., at least 4) points have the same power, the points $\{Q_i\}$ are selected with the goal of having the overall time-domain signal have a PAR as low as possible.

An example of one such table of candidates is shown in Table 1. Note that in Table 1, only the points in the first quadrant of the QAM constellation are shown. By rotating each point by 90, 180 or 270 degrees, three more points with the same power can be obtained.

TABLE 1

QAM Point with Power Closest to Average Power

| bi | Q (show in 1st quadrant only) | # of Q's | Power difference in dB |
|---|---|---|---|
| 2 | (1, 1) | 4 | 0 |
| 3 | (1, 3) | 4 | +2.2 |
| 4 | (1, 3), (3, 1) | 8 | 0 |
| 5 | (3, 3) | 4 | −0.46 |
| 6 | (3, 5), (5, 3) | 8 | −0.92 |
| 7 | (1, 9), (9, 1) | ≧8 | 0 |
| 8 | (1, 13), (7, 11), (11, 7), (13, 1) | ≧16 | 0 |
| 9 | (13, 13), (7, 17), (17, 7) | ≧12 | +0.10 |
| 10 | (7, 25), (25, 7) | ≧8 | −0.05 |
| 11 | (31, 19), (19, 31) | ≧8 | 0 |
| 12 | (37, 37), (23, 47), (47, 23), (11, 51), (51, 11) | ≧20 | ±0.01 |
| 13 | (23, 69), (69, 23) | ≧8 | 0 |
| 14 | (97, 39), (39, 97), (27, 101), (101, 27) | ≧16 | 0.003 |
| 15 | (43, 139), (49, 137), (59, 133), (71, 127) ... | ≧32 | 0.002 |

In Table 1, "power difference" means the power difference between the power of the point chosen and the QAM constellation average power of the stationary signal (e.g. REVERB). For big $b_i$'s, the number of possible candidates for $Q_i$ is quite large. The power deviation from the average is very small. Note that some points not listed in Table 1 may also be used if a slightly bigger power deviation is allowed. However, to achieve reasonably small PAR with a relatively low complexity PAR minimization algorithm, a small number of Q's should be sufficient.

As indicated earlier, if $Q_i$ has the desired power, there are at least three more points with the same power: $-Q_i$ and $Q_i^* e^{\pm j90°}$. Therefore, the number of candidate $Q_i$'s is a multiple of 4. $Q_i$ can be selected, for example, as one of these 4 possible points. If there are N used bins, and each bin has only 4 possible $Q_i$'s, then there are a total of $4^N$ possible combinations of $Q_i$'s. Some of the combinations result in the same PAR. For example, $(Q_1, Q_2, \ldots)$, $(-Q_1, -Q_2, \ldots)$, $(Q_1 e^{+j\pi°}, Q_2 e^{+j90°}, \ldots)$, and $(Q_1 e^{-j90°}, Q_2 e^{-j90°}, \ldots)$ have the same PAR. A PAR optimization method can be executed to find the optimum combination of $Q_i$'s of all the carriers to minimize PAR. The result of the optimization will be a set of the binary input bits $X_i$ which will result in the QAM point selected to achieve minimum PAR.

Figure 3:
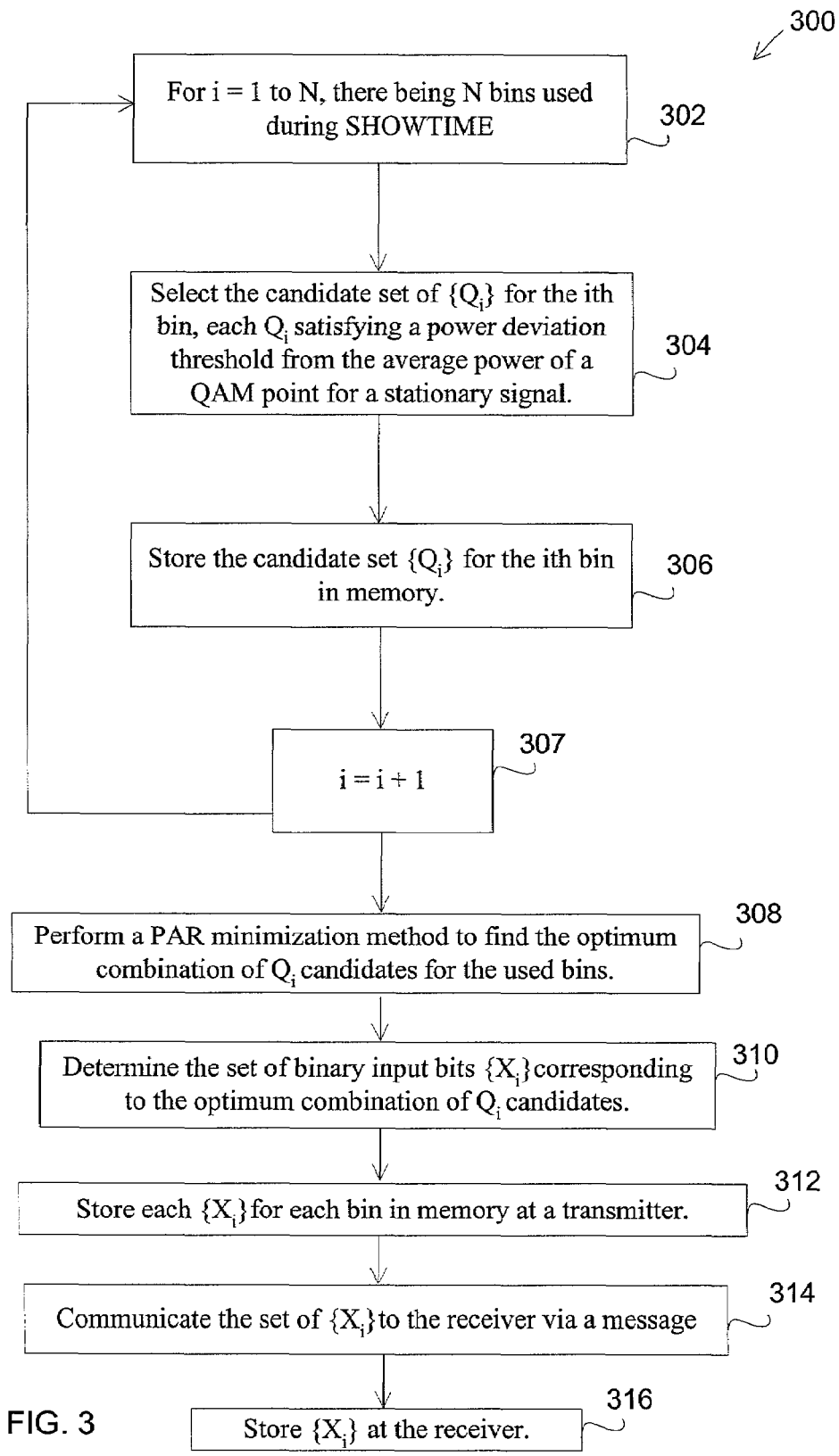
FIG. 3 illustrates an overall method for determining a set of input bits corresponding to a set of constellation points {$Q_i$} from bins used in a payload carrying mode in accordance with an embodiment of the present invention.

FIG. 3 illustrates an overall method 300 of determining a set of input bits corresponding to a set of constellation points $\{Q_i\}$ from the SHOWTIME QAM constellation at each used bin satisfying a PAR minimization threshold in accordance with an embodiment of the present invention. The processing is illustrated as a loop 302, but it would be apparent to those of skill in the art that other constructs may be used such as an If-then construct. For each bin 302 of the bins used during SHOWTIME, e.g. N bins, a candidate set $\{Q_i\}$ is selected 304. For unused bins, no signal is transmitted, since $g_i$ is 0. A constellation point $Q_i$ is available for the bin and the three points—$Q_i$, $Q_i e^{+j90°}$, and $Q_i e^{-j90°}$ having a power satisfying a power difference threshold from the average power for the constellation for the bin used by the stationary signal during training. As stated above, more points may also satisfy the threshold and be included in the candidate set. However, the more points increase the complexity of determining the minimum PAR points for all the carriers. Complexity may be measured in terms of the number of arithmetic operations, the number of loops, the number of conditional operations, and the required memory size for processing. The candidate set $\{Q_i\}$ is stored 306 for the bin in a memory and the next bin is processed. In this example, the loop counter is incremented by one 307. Once a candidate set $\{Q_i\}$ including a SHOWTIME constellation point for each bin has been selected, a PAR minimization method is performed 308 to find the combination of $Q_i$'s for the used bins representing a time domain signal having a PAR within a predetermined threshold. Next, the set of binary input bits $\{X_i\}$ corresponding to the optimum combination of $Q_i$ points is determined 310 and stored 312 in memory at the transmitter. The set $\{X_i\}$ is communicated 314 to the receiver and stored 316 in memory at the receiver.

Figure 4:
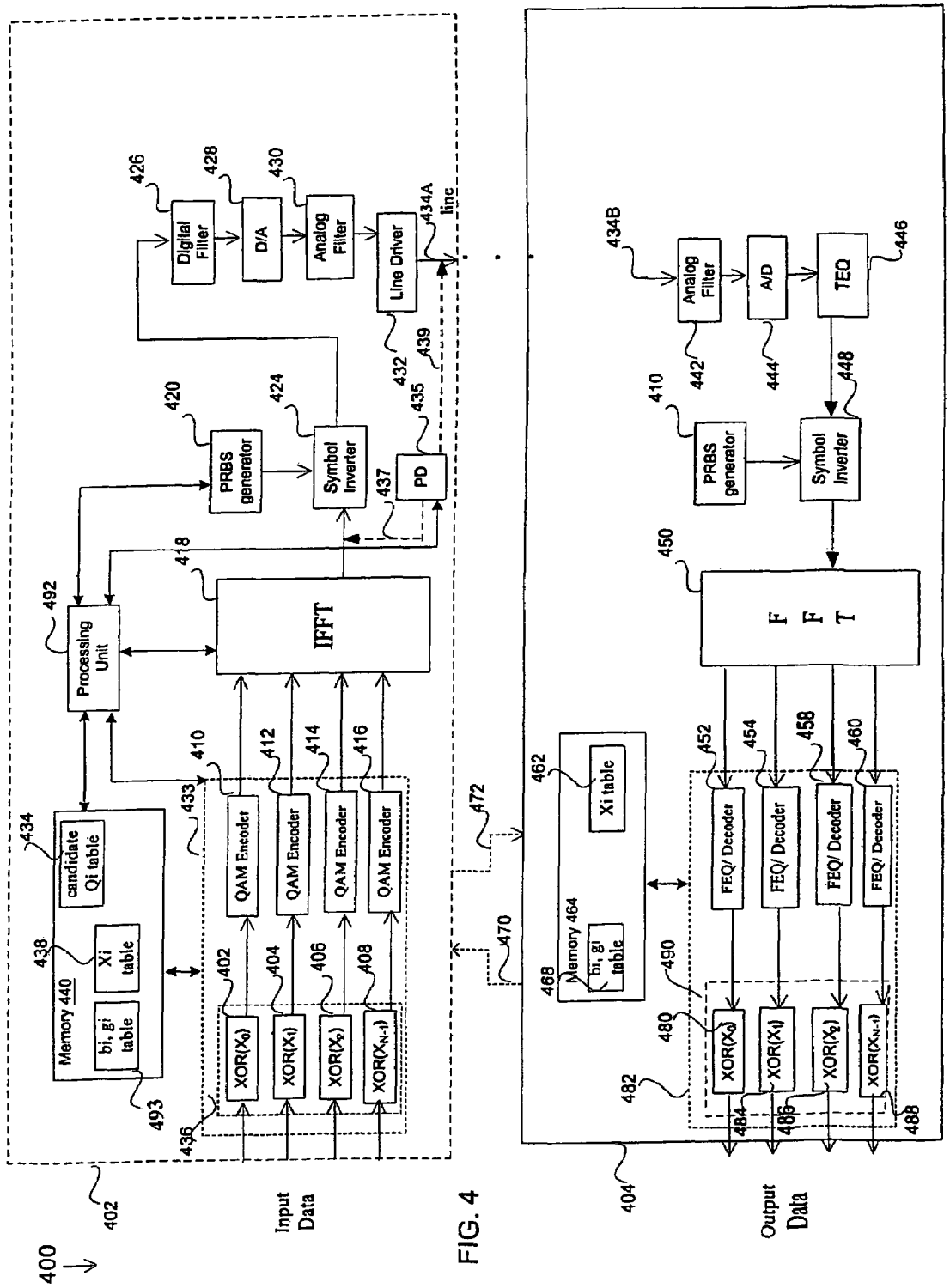
FIG. 4 illustrates an ADSL transmission system having a transmitter and a receiver in accordance with an embodiment of the present invention.

FIG. 4 illustrates an ADSL transmission system 400 in accordance with an embodiment of the present invention. The system has an embodiment of a transmitter located at one end of the system, for example at a central office that accesses a high speed data network, in accordance with one aspect of the present invention and an embodiment of a receiver 404 located at the other end of the system, for example a remote location such as a customer premises having access to the customer's data terminal equipment. In another embodiment of the invention, the locations of the transmitter 402 and receiver 404 may be reversed. The transmitter 402 and the receiver 404 may each be embodied in a processor such as a digital signal processor (DSP). Additionally, one or more of the elements shown in FIG. 4 may be implemented in software, hardware, firmware, or any combination thereof and/or stored in, for example, a computer usable or computer readable medium. Those skilled in the art will appreciate that although the elements are depicted as individual units, any combination of the elements of the transmitter, the receiver or both may also be implemented in software or in a single discrete unit such as a DSP chip.

In FIG. 4, the transmitter 402 comprises a memory 440 having a $\{b_i, g_i\}$ table, a table of the set of input bits $\{X_i\}$ that will be encoded to represent the Q-mode signal, and a table of sets of candidate $\{Q_i\}$ for each bin used during SHOWTIME as indicated by the $\{b_i, g_i\}$ table. A processing unit 492 is communicatively coupled to the memory 440, the bit-to-symbol encoder 433, Inverse Fast Fourier Transform Module 418, the PRBS generator 420, and the power detector 435. The processing unit performs control functions, message handling, and executes instructions for performing processing associated with PAR minimization methods or the transmission of data. A bit-to-symbol encoder 433 accesses the memory 440 and encodes the set of input bits $\{X_i\}$ to its corresponding PAR optimized or PAR minimized set of constellation points $\{Q_i\}$, which are transferred to an Inverse Fast Fourier Transform Module 418 that transforms the set $\{Q_i\}$ to time domain symbols. In this embodiment, the symbols are inverted by a symbol inverter 424 under the control of a pseudo-random (PRBS) generator 420. In other versions, the PRBS generator may be disabled. The symbol inverter provides the equivalent of a logical XOR function. The symbols are then forwarded to the digital filter 426, and from there to the digital to analog converter 428. The symbols in analog form are then forwarded to an analog filter 430 and to the line driver 432 for amplification.

From there, the symbols are transmitted over a transmission path 434A beginning, in this embodiment with a telephone line, to ultimately arrive at a receiver 404. In this embodiment, the transmitter 402 further comprises a power detector 435 for measuring the peak power and average power at either the IFFT output 437 or the line driver output 439. The power detector 435 sends data to the processing unit 492.

The bit-to-symbol 433 encoder comprises a mapping module 436 comprising logic 402, 404, 406, 408 for mapping an input data stream, in this example zeroes, to the set of input bits $\{X_i\}$. In this embodiment, the logic 402, 404, 406, 408 implements an XOR operation on the input data bits and $X_i$ for each bin used during SHOWTIME. The XOR logic 402, 404, 406, 408 in this example implements the relationship output(i)=XOR(input(i),$X_i$) for each bin. For the input data stream of zeroes, the output(i) will be $X_i$ which is then encoded to $Q_i$ in the set of optimum $\{Q_i\}$ points by the QAM encoders 410, 412, 414, 416. If Trellis encoding is used, it is performed before the XOR operation. More specifically, both uncoded bits and coded bits are XORed with $X_i$.

The receiver 404 receives the time domain symbols in analog form from the end of the transmission path 434B, e.g. a telephone line. An analog filter 442 receives the symbols, filters them, and forwards them to an analog to digital converter 444 for conversion to digital form. The symbols now in digital form are forwarded to a time-domain equalizer (TEQ) 446. The TEQ 446 compensates for channel distortion in the time-domain such that the combined impulse response of the channel and the TEQ 446 is within the length of a cyclic prefix. The cyclic prefix is removed after TEQ 446 and the bits are sent to symbol inverter 448 under the control of a PRBS generator 410 which may also be disabled in other embodiments. The (fast Fourier transform) FFT demodulator 450 receives the bits from the symbol inverter 448 and separates and demodulates all the sub-channels. After the FFT demodulator 450, the bits for each bin or sub-channel are forwarded to a Symbol to Bit Decoder module 482 comprising symbol to bit decoders 452, 454, 458, 460. In this example, the frequency domain equalizer (FEQ) is included as part of this module, but it will be apparent to those of skill in the art that the FEQ can be implemented separately as well. A FEQ provides further compensation for amplitude and phase distortion for an associated sub-channel. A FEQ has coefficients that characterize the distortion of an associated sub-channel and can be used to compensate, or equalize that distortion.

Each symbol decoder 452, 454, 458, 460 of the Symbol to Bit Decoder module 482 decides which signal point from the constellation for the bin is represented by the received signal. The actual structure of the decoder may vary depending on the encoding scheme used by the transmitter 402. For an embodiment of an uncoded system, the symbol decoder can be a slicer. For a Trellis-code modulation system, a Viterbi decoder may be used for making the decisions to improve the reliability of the decision.

Each symbol decoder converts each symbol to $X_i$, the binary bits representing the point $Q_i$. The Symbol to Bit Decoder module 482 further comprises a demapping module 490 comprising logic 480, 484, 486, 488 for mapping $X_i$ back to its original value in the input data stream that was transmitted. In the example above zeroes are transmitted during Q-mode. In this embodiment, the logic 480, 484, 486, 488 implements an XOR operation on each of the $X_i$ for each bin used during SHOWTIME. The receiver has the $\{X_i\}$ stored in its memory 464. Either before or during SHOWTIME or before or during Q-mode, the transmitter 402 communicates the set of input bits to the receiver 404, for example the transmitter sends a message including the set $\{X_i\}$. The XOR logic 480, 484, 486, 488 in this example implements the relationship output(i)=XOR($X_i$, $Y_i$) where $Y_i$ is the I-th bin output. The output(i) will be input(i), the original data value transmitted. If a Viterbi decoder is used, the coded bits are adjusted to compensate for the XOR operation on coded bits in the Trellis encoder. The uncoded bits are XORed after the decoder. As a result, the receiver will get all zero bits as output in the Q-mode. The receiver in this example may forward this data to customer data terminal equipment.

Second generation ADSL standards provide for reconfiguration of the ADSL modem parameters during SHOWTIME (normal operation) without having to resort to initialization. The receiver 404 initiates reconfiguration changes. These reconfiguration changes can occur at either the physical media dependent (PMD) sublayer or the physical media specific transmission convergence (PMS-TC) sublayer or both. Some of the reconfiguration changes do not impact the $\{b_i, g_i\}$ tables while others do. Online reconfiguration due to bit swapping and dynamic rate adaptation result in modification of the $\{b_i, g_i\}$ tables. The receiver 404 communicates whether bit swapping or dynamic rate adjustment is appropriate, and whether the fine grain adjustments or transmit gain factors $g_i$ should be scaled. FIG. 4 illustrates a message 470 from the receiver to the transmitter and another message 472 from the transmitter 402 to the receiver 404. Message handling between modems in DSL systems including ADSL systems are known to those skilled in the art. For example, a reconfiguration message may be used to inform the other side using the existing ADSL overhead channel (AOC) protocol. Examples of messages 470 from the receiver include a reconfiguration message such as a bit swap request or a dynamic rate adjustment request. An example of a message 472 from the transmitter is an acknowledgement of the request.

Once the $\{b_i, g_i\}$ table is proposed to be modified, a PAR minimization algorithm is run based on the new $\{b_i, g_i\}$ table for a subset of bins including the modified bins. The result would be a new set of input bits $X_i$'s for certain sub-carriers. These new input bit mappings would then be included in a reconfiguration message to inform the other side. In one embodiment, the reconfiguration message using the existing AOC protocol sends only those $X_i$'s that have been modified to reduce the transmission overhead of this information over the AOC channel. These $X_i$'s would take effect in the remote receiver at the start of a known symbol (for synchronization) along with the new $\{b_i, g_i\}$table.

Minimizing the PAR of the transmitted time-domain signal is performed using a PAR minimization algorithm. As mentioned above, in an ADSL embodiment, the PAR minimization algorithm is executed in training after the transmitter receives the bit and gain table $\{b_i, g_i\}$. Vendors may develop their own PAR minimization algorithms and make compromises between complexity and performance. Vendors can also choose not to save power in the Q-mode by simply choosing all $X_i$ bits be 0 for all the XOR operations. In this embodiment, the present invention provides a technique that assures backwards compatibility to the older version ADSL modems which do not have a Q-mode function.

In one embodiment, a system for minimizing the PAR of the Q-mode signal comprises a processing unit for executing instructions, including those of a PAR minimization method, that is communicatively coupled to a memory, a bit-to-symbol encoder, an Inverse Fast Fourier Transform Module, and a power detector to receive data from the power detector. The bit-to-symbol encoder for converting a set of input bits for a number of bins to symbols that are forwarded to an inverse fast-Fourier transformer for transforming the symbols into a time-domain signal, a power detector for detecting the average power and peaks outside the peak threshold, and a memory for storing results. The power detector may be placed at the output of the IFFT or at the output of a line driver for taking measurements. The transmitter 402 of FIG. 4 illustrates an embodiment of such a system comprising these elements 433, 418, 440, 435. The system may also be implemented offline from the transmitter. For example, if a PAR minimization is performed due to an online reconfiguration such as bit swapping, the PAR minimization may be performed by a system coupled to the transmitter that downloads the new set of input bits $\{X_i\}$ to the memory 440 of the transmitter 402.

Figure 5:
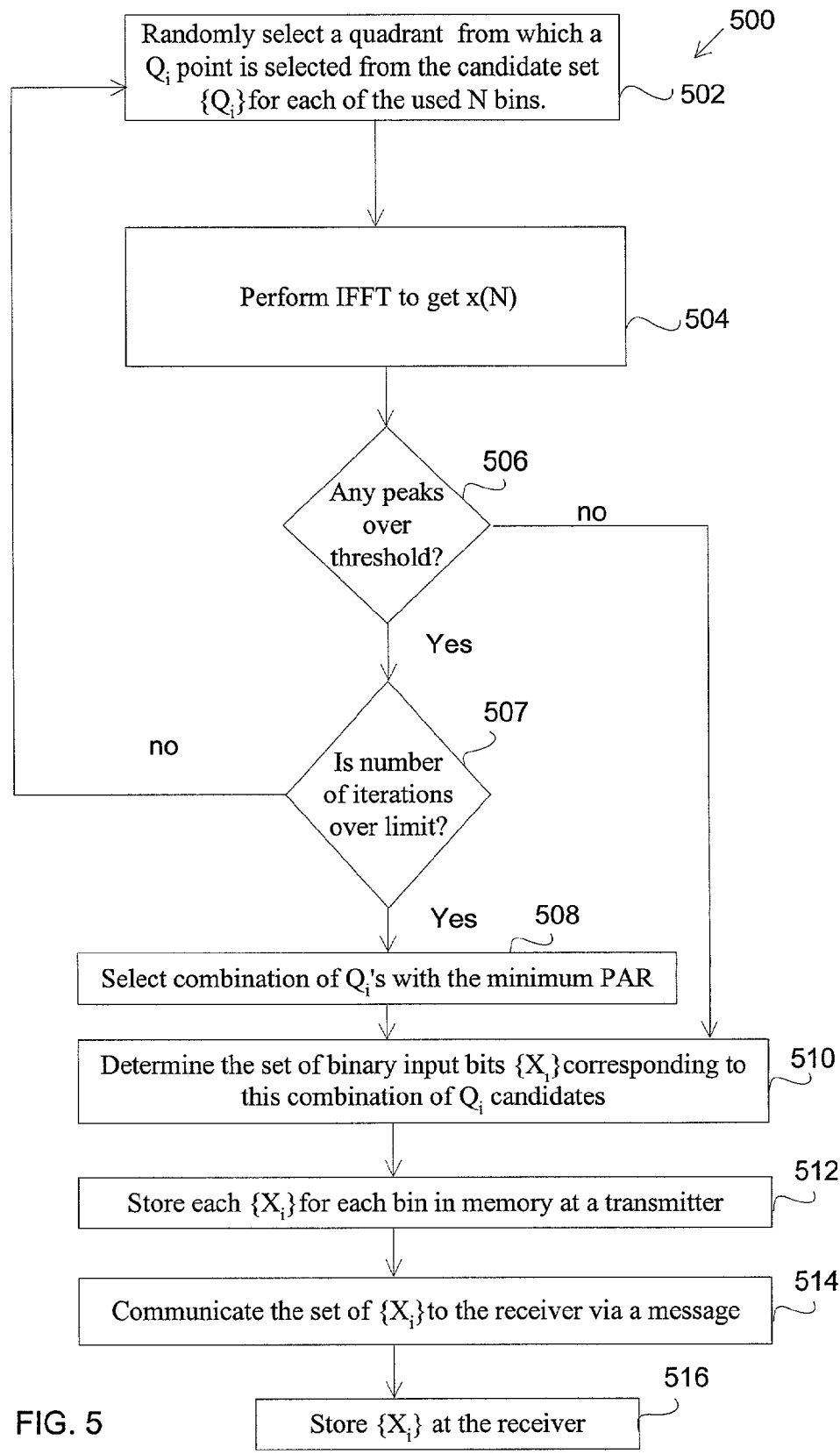
FIG. 5 illustrates a random quadrant selection PAR minimization algorithm that may be used in accordance with an embodiment of the present invention.

FIG. 5 illustrates a random quadrant selection PAR minimization method 500 that may be used in accordance with an embodiment of the present invention. A random number generator may be used to randomly select 502 a quadrant from which a $Q_i$ point is selected from the candidate set $\{Q_i\}$ for each of the N bins used during the payload data carrying mode (e.g. SHOWTIME). For example, the random number generator may generate 2 bits for each bin to select a quadrant, in effect randomly choosing the phase of the $Q_i$ point. An inverse Fourier transform or an inverse fast-Fourier transform is performed 504 on the randomly selected set of points for the used bins to generate a time domain signal x(N). It is determined 506 whether all the peaks of the x(N) carriers are within a peak threshold of the average power as represented by the RMS average power or another representation of average power. If they are, then a signal with a suitable PAR has been found for a Q-mode signal. The set of input bits $\{X_i\}$ corresponding to the combination of $Q_i$ satisfying the PAR threshold is determined 510, stored 512 in memory for a transmitter, communicated 514 to a receiver, and stored 516 in memory at the receiver. However, if there are one or more peaks not within the threshold causing an unacceptable PAR, it is determined 507 whether a maximum number of iterations has been exceeded. If not, another set of quadrants is randomly selected 502 and the process repeats until a signal with an acceptable PAR is found or the iterations limit is met.

Figure 6:
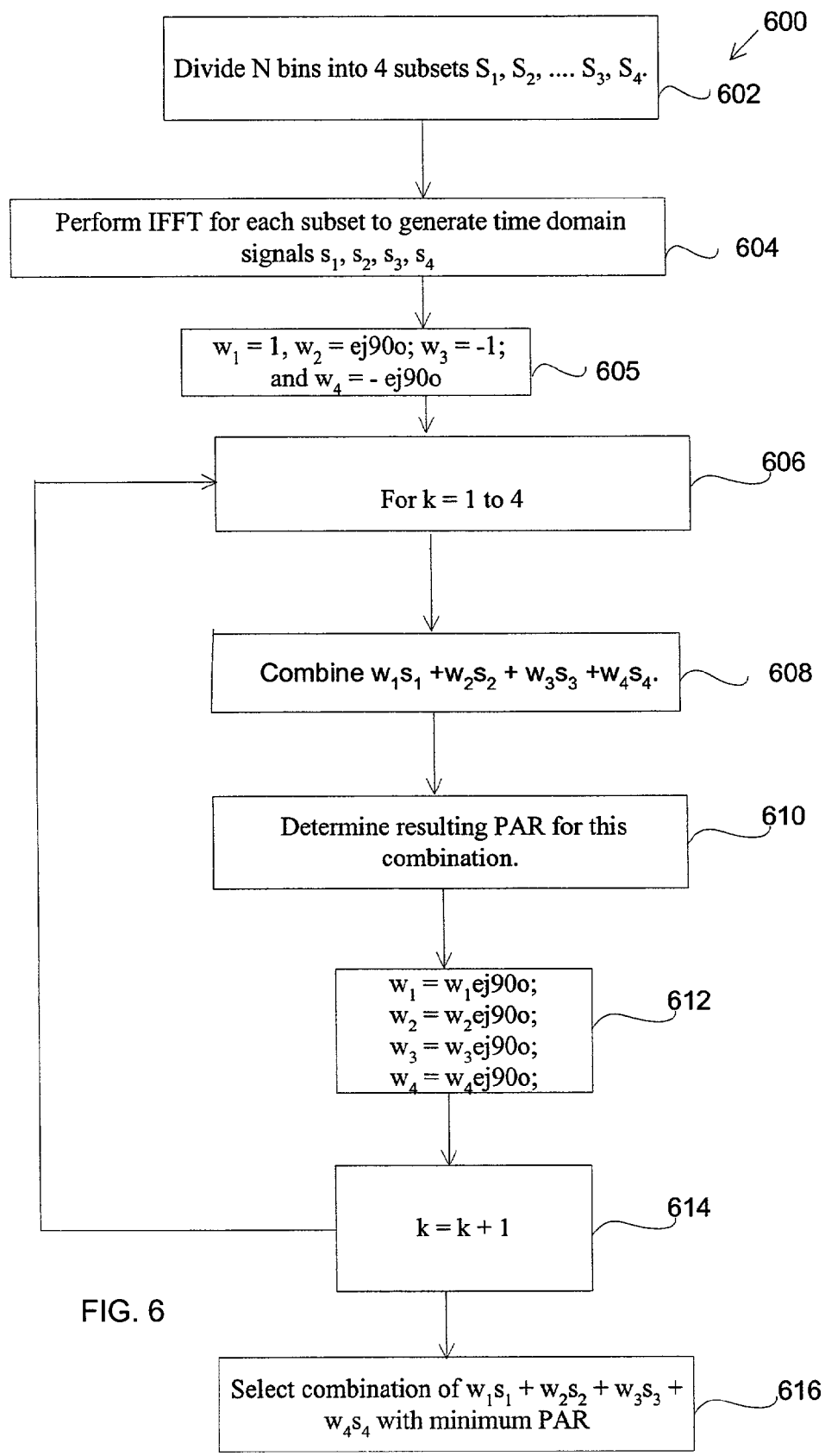
FIG. 6 illustrates an optimum subset rotation PAR minimization algorithm that may be used in accordance with an embodiment of the present invention.

FIG. 6 illustrates an optimum subset rotation PAR minimization algorithm or method 600 that may be used in accordance with an embodiment of the present invention. This method of optimum subset rotation provides less complexity by not using an IFFT for each iteration. In the embodiment of FIG. 6, the N bins used during the payload data carrying state are divided 602 into four subsets $S_1$, $S_2$, $S_3$ and $S_4$. Four smaller IFFTs are performed 604 first on $S_1$, $S_2$, $S_3$ and $S_4$, respectively, to generate time domain signals $s_1$, $s_2$, $s_3$ and $s_4$. Each of these subsets will be rotated through the four quadrants. Again a loop 606 construct illustrates this example of processing, but other processing constructs such as an If-then construct may also be used. Each of these signals is multiplied 608 by a phase multiplier, $w_i=1, e^{j90°}$, $-1$, and $e^{-j90°}$, for i=1,2,3,4 as represented by $w_1s_1$, $w_2s_2$, $w_3s_3$ and $w_4s_4$ and combined 608 by a combiner. The resulting PAR for this combination is determined 610. In each iteration of the loop, each of the signals is then multiplied 608 by a different phase multiplier 612 so as to rotate the phase of the signal 90°. Each of these signals $s_1$, $s_2$, $s_3$ and $s_4$ are combined 608, and a resulting PAR for this combination is determined 610. Rotation of the signals occurs through all four quadrants. The combination of $w_1s_1$, $w_2s_2$, $w_3s_3$ and $w_4s_4$ with the minimum PAR is selected 612. If the combination of subsets with the minimum PAR does not meet the PAR threshold, the N bins may be divided into different subsets in terms of size or the points selected, and the process is repeated. There are a total of $4^4$=256 possibilities, some of which are equivalent (resulting in the same PAR), but there are still many possibilities so that a low PAR combination can be found. Here, the compromise between complexity and performance is simplified. A small number of cases can be searched, and a smaller PAR reduction can be obtained, or vice versa. The N bins may be divided into more subsets (e.g., 8,16, . . . ) to possibly achieve more PAR reduction at the cost of increased complexity.

Figure 7:
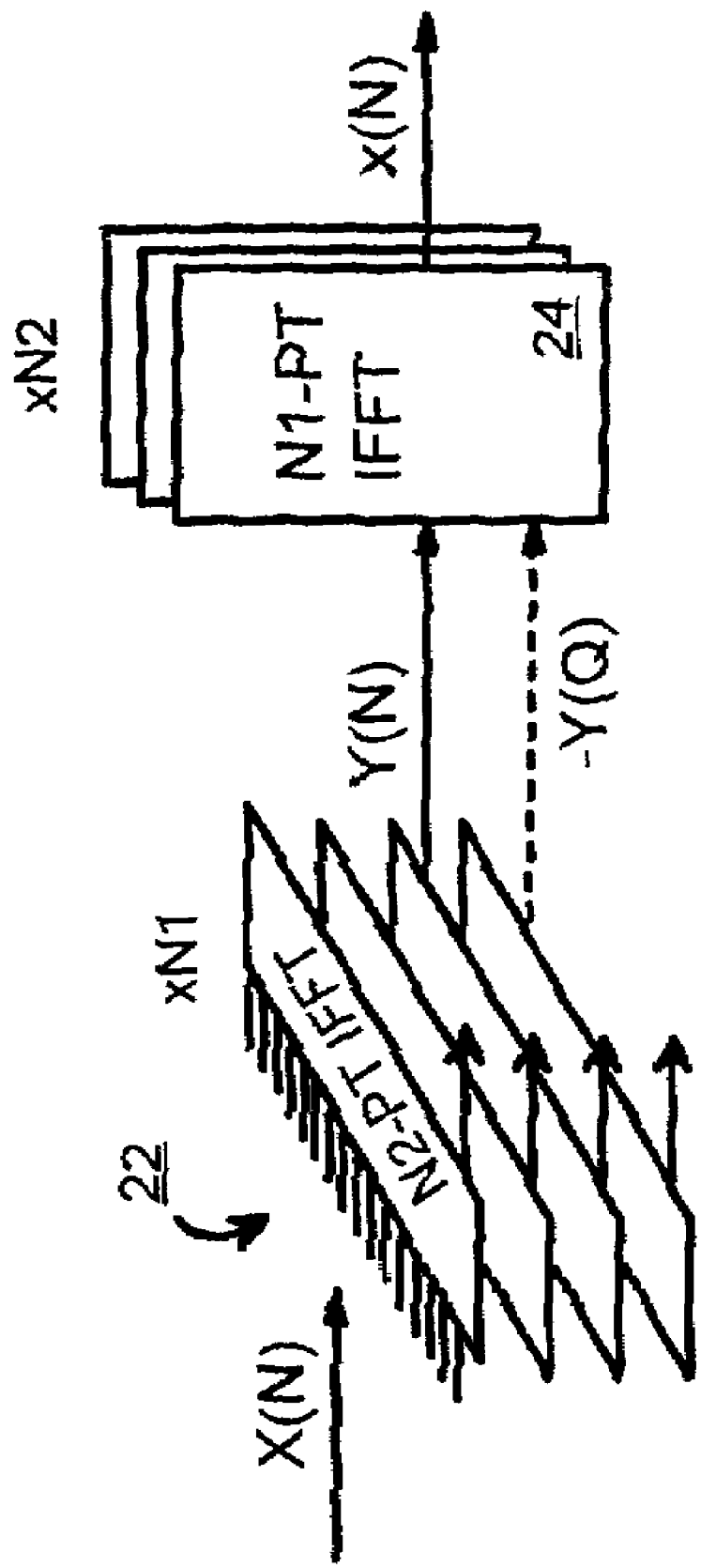
FIG. 7 shows a PAR reduction method by sign-inversion of intermediate results in a 2-stage inverse fast-Fourier transformer in accordance with an embodiment of the present invention.

Other examples of optimum subset rotation algorithms were described in U.S. Pat. No. 6,240,141 entitled "Lower Complexity Peak-to-Average Reduction Using Intermediate-Result Subset Sign-Inversion for DSL," inventor Guozhu Long, which is hereby incorporated by reference. FIG. 7 shows a PAR reduction method by sign-inversion of intermediate results using a 2-stage inverse fast-Fourier transformer in accordance with an embodiment of the present invention. The input used frequency bins X(N) are transformed from the frequency domain to the time domain signal x(N) by an inverse fast-Fourier transform (IFFT). The parameter N is factored as N=$N_1$*$N_2$ for a two-step or two-stage IFFT.

The frequency-domain input X(N) is placed column-wise into a rectangular $N_2 \times N_1$ matrix and input to first transform 22. First transform 22 contains $N_1$ transforms, and each transform is an $N_2$-point IFFT transform. Each of the $N_1$ transforms performs an $N_2$-point IFFT given by the equation:

$$S(i,k) = \sum_{l=0}^{N_2} X(l*N_1 + i)e^{j2\pi kl/N_2}$$

for the i-th $N_2$-point IFFT

The result of each $N_2$-point transform is rotated by $e^{j2\pi ik/N_2}$ to form $N_2$ outputs Y(i,k): Y(i,k)=S(i,k) $e^{j2\pi ik/N_2}$.

A total of $N_1 \times N_2$ intermediate outputs Y(i,k) are generated. These intermediate outputs are input to second transform 24. Second transform 24 contains $N_2$ transforms, each being an $N_1$-point IFFT. Second transform 24 performs the equation for the k-th $N_1$-point IFFT:

$$x(i,k) = \sum_{l=0}^{N_1-1} Y(l,k)e^{j2\pi il/N_1}$$

Second transformer 24 converts the intermediate result Y(i,k) to the final output x(n)=x(i,k) where n=i*$N_2$+k, i=0, 1, . . . $N_1$–1; k=0, 1, . . . $N_2$–1, n=0, 1, . . . N–1.

When a peak exceeding the peak threshold is detected, one or more of the subsets is inverted. The input subset has one or more rows of $N_2$ inputs. Since the first transformer 22 is an $N_2$-point IFFT that operates on a row of $N_2$ inputs, sign inversion of an input subset causes the corresponding intermediate outputs to invert. Since all of the inputs in a subset are inverted, each of the corresponding intermediate outputs is also inverted.

Rather than invert the signs of an input subset and repeat the first-stage IFFTs, it is equivalent and much simpler that, the signs of an intermediate-result subset is inverted directly. The inverted intermediate subset Q is shown as –Y(Q). The remaining, un-inverted intermediate results Y(i) and the inverted intermediate subset –Y(Q) are input to second transformer 24 to generate the revised output x(N).

Figure 8:
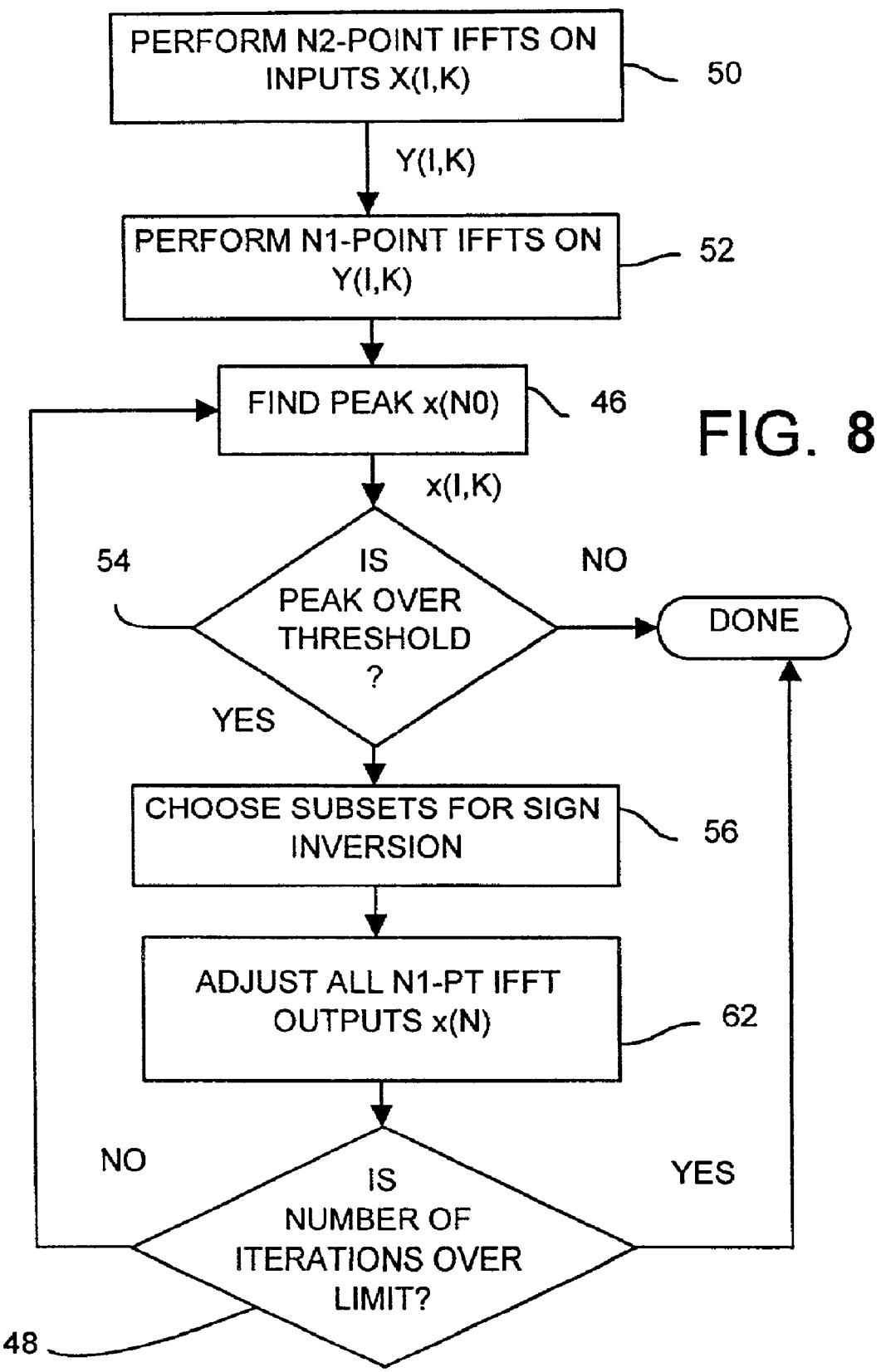
FIG. 8 is a flowchart for a PAR minimization method using intermediate-result sign-inversion in accordance with an embodiment of the present invention.

FIG. 8 is a flowchart for an intermediate-result sign-inversion for PAR reduction method in accordance with an embodiment of the present invention. The frequency-domain inputs X(N) are loaded column-wise into an $N_2 \times N_1$ matrix X(i,k), where X(i,k)=X(n)=X(i+$N_1$*k), n=0 to N–1, k=0 to $N_2$–1 and i=0 to $N_1$–1. An $N_2$-point IFFT is performed on each row of $N_2$ inputs to produce a row of $N_2$ intermediate-result outputs Y(i,k). A total of $N_1$ of the $N_2$-point IFFTs are performed 50. This is the first transformer.

The intermediate results Y(i,k) are stored for later use, but are also sent to the second transformer. $N_1$-point IFFTs are performed on each column of $N_1$ of the intermediate results Y(i,k). A total of $N_2$ of the $N_1$-point transforms are performed 52, yielding the output matrix x(i,k).

The matrix (i, k) is scanned for peaks, and the largest peak (the output with the highest absolute value) is detected 46. This peak is located at time $N_0$. The peak's voltage is compared to the peak threshold 54. If the largest peak is within the peak threshold, then PAR is acceptable, and sign inversion is not required. The set of input bits {$X_N$} corresponding to the time-domain outputs x(N) is determined, stored in a memory (e.g. 440) for a transmitter (e.g. 402), communicated (e.g. via a message) to a receiver (e.g. 404) and stored for the receiver in its memory (e.g. 464).

When a peak over threshold is detected 54, one or more of the subsets need to be inverted to try to reduce the peak's voltage. One set of the subsets is chosen 56 for inversion. Rather than randomly choose a set of subsets, the effects of the sign inversion of sets of subsets on the peak value are evaluated first to find out which sign inversion pattern gives the best peak reduction effect. The peak is at $N_0$=i0*$N_2$+$k_0$, where the column is $k_0$, and the row is $i_0$.

Once the subset is chosen for sign-inversion, the final outputs are re-calculated. Rather than simply re-execute the entire IFFT, or even re-execute the second transform, the outputs are adjusted. When n0 is the index of the peak output, x(n0) is calculated from the intermediate results Y(i,$k_0$), i=0, 1, . . . $N_1$–1.

$$x(i_0, k_0) = \sum_{l=0}^{N_2-1} Y(l, k_0)e^{j2\pi li_0/N_1}$$

If the i1-th row is sign inverted, among all $N_1$ values of Y(i,$k_0$), only Y($i_1$,$k_0$) changes its sign. The term –Y($i_1$,$k_0$) $e^{j2\pi i_1 i_0/N_1}$ replaces Y($i_1$,$k_0$) $e^{j2\pi i_1 i_0/N_1}$ in the second transform's sum. The difference is thus –2Y($i_1$, $k_0$) $e^{j2\pi i_1 i_0/N_1}$. If this sign inversion can effectively reduce the peak, each output x(i,k) has –2Y($i_1$,k) $e^{j2\pi i_1 i_0/N_1}$ added 62. All N outputs are adjusted instead of recalculating entire $N_2$ $N_1$-point IFFT.

Calculation is reduced since computing and adding this term to adjust the output is simpler than recalculating the entire $N_1$-point IFFT when $N_1$ is reasonably large. For the sign inversion of each subset, one adjusting term is added. The complexity is thus proportional to the number of subsets inverted. Typically, the maximum number of subsets inverted can be limited. When $N_1$ is very small the $N_1$-point IFFT can simply be re-calculated.

When too many iterations have occurred 48, the attempt at PAR reduction is ended. Since the probability of not being able to reduce the peak is very small. When the number of iterations is still within the allowed number of iterations, the search for the largest peak continues 46. The location N0 of the largest peak can change with each iteration, especially when the peak threshold is low. When the new largest peak is below threshold 54, PAR reduction ends. Bits in the data stream are set or cleared to indicate to the receiver which subsets were inverted. For additional information on this embodiment and other embodiments using sign inversion, see U.S. Pat. No. 6,240,141 which is incorporated by reference.

Figure 9:
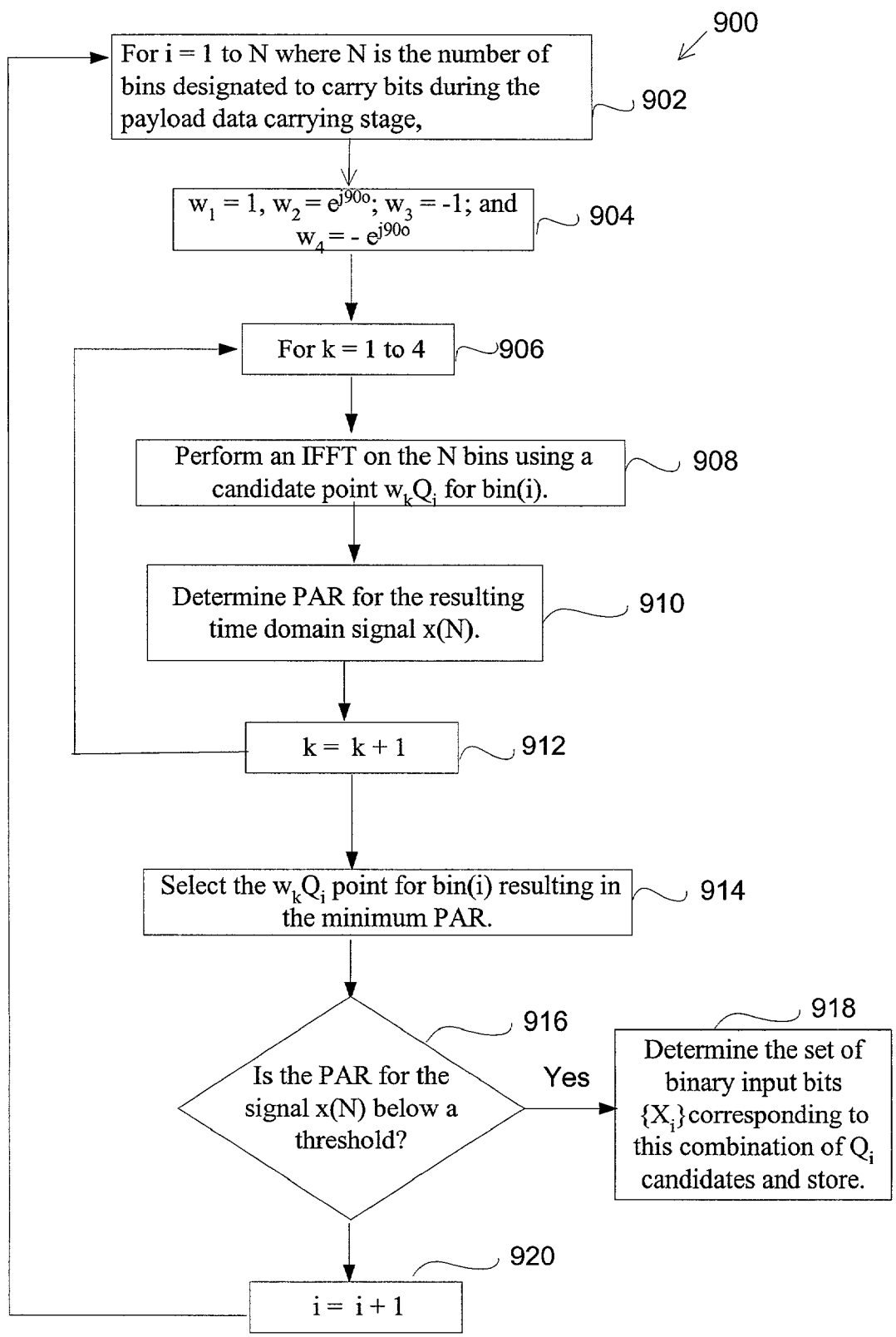
FIG. 9 illustrates a sequential quadrant optimization PAR minimization algorithm using a bin-by-bin approach that may be used in accordance with an embodiment of the present invention.

FIG. 9 illustrates a sequential quadrant optimization PAR minimization method 900 using a bin-by-bin approach that may be used in accordance with an embodiment of the present invention. An initial signal, such as the combination of $Q_i$ points from the first quadrant for each of the N bins designated to carry payload data may be used as a starting signal. Of course, points from a different quadrant may also be used or a combination of points from different quadrants may also be used. For each of the N bins 902, a candidate point $Q_i$ for the bin is selected having a certain phase 904. For example, the constellation point may be represented as $w_k Q_i$, where $w_k = 1$, $e^{j90°}$, $-1$, or $e^{-j90°}$. Phase multipliers are initialized 904 as follows: $w_1 = 1$, $w_2 = e^{j90°}$, $w_3 = -1$, and $w_4 = e^{-j90°}$. Again the processing of this example is illustrated using loop constructs but it is apparent to those of skill in the art that other processing constructs can be used. An IFFT is performed 906 on the N bins using candidate point $w_k Q_i$ for the ith bin. The PAR is determined 908 for the resulting time domain signal x(N). The loop counter k is incremented 912 by one so that 90° is effectively added to the phase multiplier. In this way, the PAR of the time domain signal as effected by the $Q_i$ point in all four quadrants is determined. The point $w_k Q_i$ for the ith bin resulting in the minimum PAR of the time domain signal is selected 914. It is determined 916 if the PAR for the signal x(N) is below a threshold. If not, an index i is incremented 920, and the previous processing is repeated for the next bin. This operation is repeated until the PAR is below the desired threshold value or all the elements of the set of bins are visited. If the PAR for the signal x(N) is below a threshold, the set of input bits $\{X_i\}$ corresponding to this combination of $Q_i$ candidate points is determined 918 and stored 918.

In the case of bit swap or dynamic rate adaptation, the line characteristics may not change dramatically, and only a few carriers may need modification of $\{b_i, g_i\}$. A localized PAR minimization may be run to find the optimal phases for the modified bins or the modified bins and a few nearby channels or the modified bins and a subset of a few randomly selected channels to obtain a resulting low PAR signal. The sequential quadrant optimization method using a bin-by-bin approach is an efficient algorithm for this purpose. The complexity of such a local minimization is low.

Figure 10:
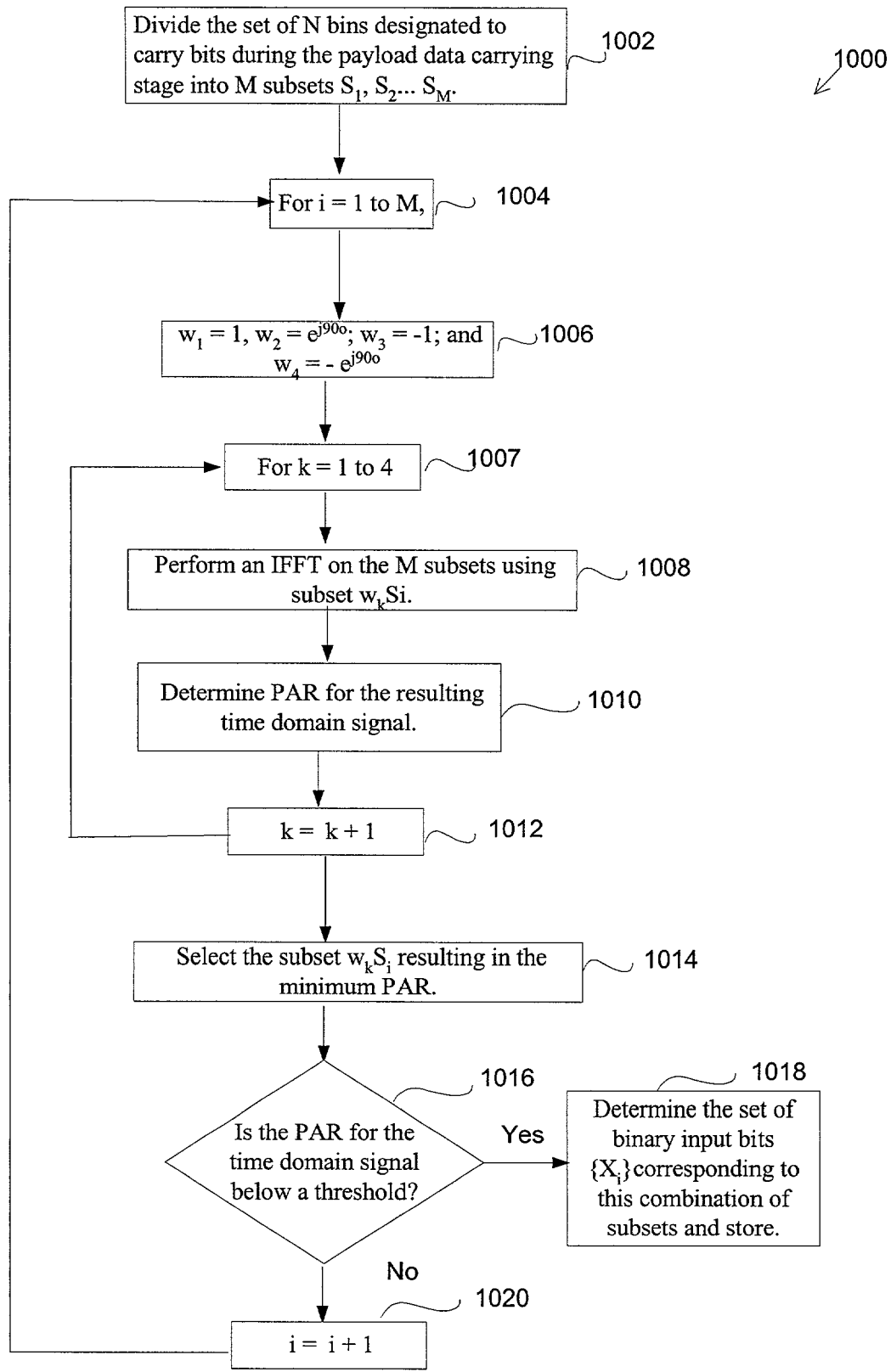
FIG. 10 illustrates a sequential quadrant optimization PAR minimization algorithm using a set-by-set approach that may be used in accordance with an embodiment of the present invention.

FIG. 10 illustrates a sequential quadrant optimization PAR minimization algorithm 1000 using a set-by-set approach that may be used in accordance with an embodiment of the present invention. This algorithm combines aspects of the optimum subset rotation method and the sequential quadrant optimization method. As in the optimum subset rotation method, N bins are divided 1002 into M subsets $S_1, S_2, \ldots S_M$. Instead of optimizing bin by bin, optimization is performed set-by-set sequentially. The PAR can be minimized by selecting the best $w_k$ for that set and moving on to the next set. This operation is repeated until the PAR is below the desired value or all the elements of the set of bins are visited. For each of the M sets 1004, the phase multipliers are initialized 1006 as follows: $w_1 = 1$, $w_2 = e^{j90°}$, $w_3 = -1$, and $w_4 = e^{-j90°}$. Again the processing of this example is illustrated using loop constructs but it is apparent to those of skill in the art that other processing constructs can be used. An IFFT is performed 1008 on the M subsets using the subset $w_k S_i$. The PAR is determined 1010 for the resulting time domain signal. An index k is incremented 1012 by one. In this way, the PAR of the time domain signal as affected by the Si subset in all four quadrants is determined. The subset $w_k S_i$ for the ith bin resulting in the minimum PAR of the time domain signal is selected 1014. It is determined 1016 if the PAR for the signal is below a threshold. If not, an index i is incremented 1020, and the previous processing is repeated for the next bin. This operation is repeated until the PAR is below the desired threshold value or all the subsets of bins have been processed. If the PAR for the time domain signal is below the threshold, the set of input bits $\{X_i\}$ corresponding to this combination of $Q_i$ candidate points in the subsets is determined 1018 and stored 1018.

For any optimization algorithm, if a dedicated pilot tone is used, it will remain unchanged. Thus, timing recovery will not be disrupted.

Next some data of the performance of the proposed Q-mode is discussed. Assume a sample downstream $\{b_i, g_i\}$ distribution. Usually, filters between the IFFT and the line driver may degrade the PAR reduction performance. If the PAR reduction is based on IFFT output, the PAR increase due to filters is about 1–3 dB. The lower the PAR before filters, the more the degradation. The filter degradation may be reduced by taking filters into consideration in the PAR minimization process, with increased complexity. Table 2 shows the results of PAR reduction for different algorithms. PAR optimization is performed either at the IFFT output, or at the line driver input to include the effect of all digital and analog filters before the line driver. In Algorithm 1, random quadrant selection (RQS), the quadrant for different bins is randomly selected, and the operation is repeated until the PAR is below a desired value. In Algorithm 2, optimum subset rotation (OSR), the downstream bins are divided into 4 subsets, and PAR minimization is run based on optimum subset rotation described earlier. With just a few iterations, PAR is quickly reduced to about 7.9 dB. If the number of subsets is increased into 8 or 16, PAR reduction can be improved further.

In Algorithm 3, sequential quadrant optimization (SQO), the quadrant for each bin is optimized one by one until PAR is below a desired value. FIGS. 11 and 12 show the result of SQO, where at each iteration the quadrant for only one bin is optimized. In FIG. 11, the PAR minimization is at the IFFT output. The PAR is increased at the line driver input due to the effect of the filters. This degradation is undesirable. In FIG. 12, the PAR minimization is done at the line driver input. It can be seen that although the PAR at the IFFT output is increased, the PAR at the line driver is small. Also shown in FIG. 12 is the re-optimization after online reconfiguration at iteration 220 where 3 bins have changed $b_i$. For comparison purpose, a REVERB signal is simulated, and the PAR is measured at the IFFT output and at the line driver input. The degradation in PAR due to analog and digital filters is about 1 dB. A partial REVERB is also simulated where only half of the bins are used. The PAR at the IFFT output is about 0.8 dB worse than a REVERB signal. At the line driver input, PAR is about 9 dB. From simulation results, it can be seen that PAR reduction at line driver input is desirable, and the PAR there can be reduced to below 7 dB at reasonable complexity.

TABLE 2

Results for PAR Optimization Algorithms

| Algorithm | Digital Output PAR [dB] | Line Driver Input PAR [dB] |
|---|---|---|
| Algorithm 1 (RQS) (IFFT output) | 8.1 | 9.9 |
| Algorithm 1 (RQS) (Line Driver Input) | 10.3 | 8.9 |
| Algorithm 2 (OSR) (IFFT output) | 7.9 | 9.9 |
| Algorithm 2 (OSR) (Line Driver Input) | 8.3 | 8.5 |
| Algorithm 3 (SQO) (IFFT output) | 6.1 | 9.5 |
| Algorithm 3 (SQO) (Line Driver Input) | 7.8 | 6.9 |
| REVERB | 7.7 | 8.6 |
| Partial REVERB | 8.5 | 9.0 |

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the hereto appended claims.

The invention claimed is:

1. A method for generating a signal for use in a power saving mode in a digital subscriber line transmission system comprising:
   determining a combination of constellation points representing a signal having a peak-to-average ratio within a threshold, each constellation point representing a symbol transmitting during a payload data carrying mode comprising the step of performing the peak-to-average ratio minimization method on one or more combinations of constellation points representing symbols transmitting during the payload data carrying mode, wherein the peak-to-average ratio minimization method is an optimum subset rotation method comprising the steps of
      dividing selected constellation points from candidate sets for each bin used during the payload data carrying mode into a number of subsets;
      generating a time-domain signal for each subset from the selected constellation points for each subset;
      adjusting a phase of each of the time-domain signals for each subset;
      combining the time domain signals for each subset into a resulting signal; and
      determining whether the resulting signal satisfies the peak-to-average ratio threshold; and
   determining a set of input bits corresponding to each of the constellation points in the combination.

2. The method of claim 1 further comprising:
   responsive to the resulting signal not satisfying the peak-to-average ratio threshold, rotating the phase of each of the time-domain signals for each subset;
   combining the time domain signals for each subset into another resulting signal; and
   determining whether the another resulting signal satisfies the peak-to-average ratio threshold.

3. A method for generating a signal for use in a power saving mode in a digital subscriber line transmission system comprising:
   determining a combination of constellation points representing a signal having a peak-to-average ratio within a threshold, each constellation point representing a symbol transmitting during a payload data carrying mode comprising the step of performing the peak-to-average ratio minimization method on one or more combinations of constellation points representing symbols transmitting during the payload data carrying mode, wherein the peak-to-average ratio minimization method is an optimum subset rotation method that uses sign-inversion of intermediate results and a two-stage inverse fast-fourier transform having the steps of
      arranging the selected constellation points from each of the candidate sets of N bins used during the payload data carrying mode as a matrix of $N_2$ columns and $N_1$ rows;
      executing a $N_2$-point inverse fast-Fourier transform (IFFT) on $N_2$ inputs from a row in the matrix, and outputting $N_2$ intermediate results to a row in an intermediate array;
      executing other $N_2$-point IFFT transforms on other rows of $N_2$ inputs and outputting $N_2$ intermediate results from each IFFT to other rows in the intermediate array until all $N_1$ have been transformed;
      executing a $N_1$-point IFFT transform on $N_1$ intermediate results from a column in the intermediate array, and outputting $N_1$ time-domain outputs to a column in an output array;
      executing other $N_1$-point IFFT transforms on other columns of $N_1$ inputs from the intermediate array and outputting $N_1$ time-domain outputs from each IFFT to other columns in the output array until all $N_2$ columns in the intermediate array have been transformed; and
      determining whether the time-domain outputs satisfy a peak threshold; and
   determining a set of input bits corresponding to each of the constellation points in the combination.

4. The method of claim 3 further comprising:
   responsive to the time-domain outputs not satisfying the peak threshold, identifying a time-domain output having a peak voltage above the peak threshold;
   determining which of the $N_1$-point IFFT transforms is a target IFFT that generated the identified time-domain output;
   examining an intermediate result that was input to the target IFFT to determine if inverting a sign of that intermediate result can sufficiently reduce a magnitude of the identified time-domain output;
   examining other intermediate results that were input to the target IFFT to determine if inverting a sign of at least one of those intermediate results can sufficiently reduce the magnitude of the identified time-domain output;
   choosing one of the intermediate results that were input to the target IFFT as a selected intermediate result;
   inverting signs of all intermediate results in a selected row of the intermediate array that contains the selected intermediate result;
   re-generating all time-domain outputs in the output array to reflect sign inversion of the selected row of the intermediate array; and
   determining whether the time-domain outputs satisfy the peak threshold.

5. A method for generating a signal for use in a power saving mode in a digital subscriber line transmission system comprising:
   determining a combination of constellation points representing a signal having a peak-to-average ratio within a threshold, each constellation point representing a symbol transmitting during a payload data carrying mode comprising the step of performing the peak-to-average ratio minimization method on one or more combinations of constellation points representing symbols transmitting during the payload data carrying mode, wherein the peak-to-average ratio minimization method is a sequential quadrant optimization method using a bin-by-bin approach having the steps of:

selecting a combination of candidate constellation points, each point being for a respective bin used during the payload data carrying mode;

determining a phase of a constellation point in the combination for a first bin from a set of phases for this point resulting in a minimum peak-to-average ratio of a time-domain signal generated from the combination using this phase of the constellation point for the first bin;

selecting the constellation point with the phase for the first bin; and determining whether the generated time-domain signal satisfies a peak-to-average ratio threshold; and determining a set of input bits corresponding to each of the constellation points in the combination.

6. The method of claim 5 further comprising:

responsive to the generated time-domain signal not satisfying the peak-to-average ratio threshold, determining a phase from a set of phases for a constellation point in the combination for the next bin resulting in a minimum peak-to-average ratio of a time-domain signal generated from the combination using the phase for the constellation point for the next bin;

selecting this constellation point with this phase for this next bin; and determining whether the generated time-domain signal satisfies a peak-to-average ratio threshold.

7. A method for generating a signal for use in a power saving mode in a digital subscriber line transmission system comprising:

determining a combination of constellation points representing a signal having a peak-to-average ratio within a threshold, each constellation point representing a symbol transmitting during a payload data carrying mode comprising the step of performing the peak-to-average ratio minimization method on one or more combinations of constellation points representing symbols transmitting during the payload data carrying mode, wherein the peak-to-average ratio minimization method is a sequential quadrant optimization method using a set-by-set approach having the steps of:

dividing a set of bins used during the payload data carrying mode into a number of subsets, each subset including a combination of candidate constellation points, each point being for a respective bin in the subset;

determining a phase multiplier of the first subset of constellation points resulting in a minimum peak-to-average ratio of a time-domain signal generated from the combinations of all the subsets using this phase multiplier for the first subset;

selecting the first subset with this phase multiplier as the combination for the first subset; and determining whether the generated time-domain signal satisfies a peak-to-average ratio threshold; and determining a set of input bits corresponding to each of the constellation points in the combination.

8. The method of claim 7 further comprising:

responsive to the generated time-domain signal not satisfying the peak-to-average ratio threshold, determining a phase multiplier for the next subset resulting in a minimum peak-to-average ratio of a time-domain signal generated from the combinations of all the subsets using this phase multiplier for this next subset;

selecting this next subset with this phase multiplier as the combination for this next subset; and determining whether the generated time-domain signal satisfies a peak-to-average ratio threshold.

* * * * *